United States Patent
Shiota et al.

(10) Patent No.: US 8,626,755 B2
(45) Date of Patent: Jan. 7, 2014

(54) ELECTRONIC ALBUM EDITING SYSTEM, ELECTRONIC ALBUM EDITING METHOD, AND ELECTRONIC ALBUM EDITING PROGRAM

(75) Inventors: Kazuo Shiota, Tokyo (JP); Yukita Gotohda, Kanagawa (JP); Akira Yoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/546,551

(22) Filed: Jul. 11, 2012

(65) Prior Publication Data

US 2012/0308161 A1 Dec. 6, 2012

Related U.S. Application Data

(62) Division of application No. 11/362,918, filed on Feb. 28, 2006, now Pat. No. 8,250,068.

(30) Foreign Application Priority Data

Feb. 28, 2005 (JP) ................................. 2005-053615
Feb. 23, 2006 (JP) ................................. 2006-047321

(51) Int. Cl.
*G06F 17/30* (2006.01)

(52) U.S. Cl.
USPC ........................................................ 707/724

(58) Field of Classification Search
None
See application file for complete search history.

(56) References Cited

U.S. PATENT DOCUMENTS

| | | | |
|---|---|---|---|
| 5,987,446 A | 11/1999 | Corey et al. | |
| 6,868,169 B2 * | 3/2005 | Staas et al. | 382/113 |
| 7,243,101 B2 | 7/2007 | Itou | |
| 7,325,061 B2 | 1/2008 | Haruki | |
| 7,653,249 B2 * | 1/2010 | Loui et al. | 382/224 |
| 7,788,592 B2 * | 8/2010 | Williams et al. | 715/764 |
| 2002/0093678 A1 | 7/2002 | Skidget et al. | |
| 2002/0145620 A1 | 10/2002 | Smith et al. | |
| 2004/0201685 A1 | 10/2004 | Seaman et al. | |
| 2005/0050043 A1 | 3/2005 | Pyhalammi et al. | |
| 2005/0108261 A1 | 5/2005 | Glassy et al. | |
| 2005/0143909 A1 * | 6/2005 | Orwant | 701/207 |
| 2005/0273725 A1 | 12/2005 | Russon et al. | |
| 2006/0041661 A1 | 2/2006 | Erikson et al. | |
| 2006/0080286 A1 | 4/2006 | Svendsen | |
| 2008/0056584 A1 * | 3/2008 | Cieplinski | 382/226 |
| 2008/0091728 A1 | 4/2008 | Diederiks et al. | |

FOREIGN PATENT DOCUMENTS

| | | |
|---|---|---|
| JP | 2002-112165 A | 4/2002 |
| JP | 2003-216621 A | 7/2003 |
| JP | 2004-220420 A | 8/2004 |

* cited by examiner

*Primary Examiner* — Neveen Abel Jalil
*Assistant Examiner* — Kevin L Young
(74) *Attorney, Agent, or Firm* — Birch, Stewart, Kolasch & Birch, LLP

(57) ABSTRACT

An electronic album editing system for editing an electronic album in consideration of categories into which images are classifies is provided. The electronic album editing system includes: a first storage section for classifying a plurality of images included in a first electronic album into a plurality of categories; a second storage section for classifying a plurality of images included in a second electronic album into a plurality of categories; a category selection section for selecting one category of the images stored in the second storage section; a range acquiring section for acquiring the range of the image information corresponding to the one category; a category detection section for detecting a category corresponding to the range similar to the acquired range using range information previously stored in the first storage section; and an editing section for storing the image classified into the detected category in the second storage section.

7 Claims, 17 Drawing Sheets

| CATEGORY | IMAGE | IMAGE-CAPTURING PERIOD INFORMATION |
|---|---|---|
| CATEGORY 200 | IMAGE 202 | ○○○○ YEAR ○○ MONTH ○○ DATE ○○ O'CLOCK ○○ MINUTES ○○ SECONDS ~ △△△△ YEAR △△ MONTH △△ DATE △△ O'CLOCK △△ MINUTES △△ SECONDS |
| | IMAGE 204 | |
| | ... | |
| CATEGORY 210 | IMAGE 212 | ×××× YEAR ×× MONTH ×× DATE ×× O'CLOCK ×× MINUTES ×× SECONDS ~ □□□□ YEAR □□ MONTH □□ DATE □□ O'CLOCK □□ MINUTES □□ SECONDS |
| | IMAGE 214 | |
| | ... | |
| ... | ... | ... |

| CATEGORY | IMAGE | IMAGE-CAPTURING TIME AND DATE INFORMATION |
|---|---|---|
| CATEGORY 300 | IMAGE 302 | ○○○○ YEAR ○○ MONTH ○○ DATE ○○ O'CLOCK ○○ MINUTES ○○ SECONDS |
| | IMAGE 304 | △△△△ YEAR △△ MONTH △△ DATE △△ O'CLOCK △△ MINUTES △△ SECONDS |
| | ... | ... |
| CATEGORY 310 | IMAGE 312 | ×××× YEAR ×× MONTH ×× DATE ×× O'CLOCK ×× MINUTES ×× SECONDS |
| | IMAGE 314 | □□□□ YEAR □□ MONTH □□ DATE □□ O'CLOCK □□ MINUTES □□ SECONDS |
| | ... | ... |
| ... | | |

| CATEGORY | IMAGE | IMAGE-CAPTURING AREA INFORMATION |
|---|---|---|
| CATEGORY 900 | IMAGE 902 | VERTEX 1 : NORTH LATITUDE ○○° ○○' ○○"<br>EAST LONGITUDE ○○° ○○' ○○" |
| | IMAGE 904 | VERTEX 2 : NORTH LATITUDE △△° △△' △△"<br>EAST LONGITUDE △△° △△' △△" |
| | ... | ... |
| CATEGORY 910 | IMAGE 912 | VERTEX 1 : NORTH LATITUDE ××° ××' ××"<br>EAST LONGITUDE ××° ××' ××" |
| | IMAGE 914 | VERTEX 2 : NORTH LATITUDE □□° □□' □□"<br>EAST LONGITUDE □□° □□' □□" |
| | ... | ... |
| ... | | |

100

110

| CATEGORY | IMAGE | IMAGE-CAPTURING POINT INFORMATION |
|---|---|---|
| CATEGORY 1000 | IMAGE 1002 | NORTH LATITUDE ○○° ○○′ ○○″<br>EAST LONGITUDE ○○° ○○′ ○○″ |
| | IMAGE 1004 | NORTH LATITUDE △△° △△′ △△″<br>EAST LONGITUDE △△° △△′ △△″ |
| | ⋮ | ⋮ |
| CATEGORY 1010 | IMAGE 1012 | NORTH LATITUDE ××° ××′ ××″<br>EAST LONGITUDE ××° ××′ ××″ |
| | IMAGE 1014 | NORTH LATITUDE □□° □□′ □□″<br>EAST LONGITUDE □□° □□′ □□″ |
| | ⋮ | ⋮ |
| ⋮ | ⋮ | ⋮ |

*FIG. 10*

ELECTRONIC ALBUM EDITING SYSTEM, ELECTRONIC ALBUM EDITING METHOD, AND ELECTRONIC ALBUM EDITING PROGRAM

CROSS REFERENCE TO RELATED APPLICATIONS

The present application is a Divisional Application of U.S. application Ser. No. 11/362,918 filed on Feb. 28, 2006 now U.S. Pat. No. 8,250,068 which claims priority from Japanese Patent Applications Nos. JP 2005-053615 filed on Feb. 28, 2005 and JP 2006-047321 filed on Feb. 23, 2006, the contents of which are incorporated herein by reference.

BACKGROUND OF THE INVENTION

1. Field of the Invention

The present invention relates to an electronic album editing system, an electronic album editing method and an electronic album editing program. Particularly, the present invention relates to an electronic album editing system, an electronic album editing method and an electronic album for editing an electronic album including a plurality of images.

2. Related Art

Recently, digital cameras have become widespread rapidly. A digital camera is different from a silver-halide camera which is designed to capture or record the optical image of an object by exposing a film to light. On the other hand, the digital camera captures an optical image of an object using a CCD and records the optical image on a recording medium such as a flash memory or the like. The image captured by the digital camera is digital data. Here, this advantage being digital data is utilized for researching a technology for managing collectively a plurality of images as an electronic album. For example, there has been known a technology for efficiently managing images by classifying images based on information indicative of the characteristic of images when the plurality of images are managed as an electronic album, as disclosed in Japanese Patent Application Publication No. 2002-112165.

It is assumed that a user intends to add the image included in the other electronic album to a certain electronic album to edit the certain electronic album when the user manages a plurality of images as the electronic albums. Here, when the user classifies each image for each category based on the characteristic of the image, it is preferred that the image added to the user's electronic album is not any image randomly selected from the other album but an image associated with the image included in the user's electronic album. In other words, it is preferred that the image to be added is suitable for a category in the user's electronic album. However, the conventional electronic album apparatus disclosed in the Japanese Paten Application Publication No. 2002-112165 does not disclose such electronic album editing method.

SUMMARY OF THE INVENTION

Thus, it is an object of the present invention to provide an electronic album system, an electronic album editing method and an electronic album editing program which is capable of solving the problem accompanying the conventional art. The above and other objects can be achieved by combining the features recited in independent claims. Then, dependent claims define further effective specific example of the present invention.

To solve the above-described problem, a first aspect of the present invention provides an electronic album editing system for editing an electronic album including a plurality of images. The electronic album editing system includes: a first storage section for classifying each of a plurality of images included in a first electronic album into a plurality of categories and storing therein the same along with previously storing range information indicative of the range of image information corresponding to each of the plurality of categories; a second storage section for classifying each of a plurality of images included in a second electronic album into a plurality of categories based on image information indicative of the characteristic of each image and storing therein the same; a category selection section for selecting one category from the plurality of categories of the images stored in the second storage section; a range acquiring section for acquiring the range of image information corresponding to one category from the image information of the image included in the one category; a category detection section for detecting a category corresponding the range similar to the range acquired by the range acquiring section using range information corresponding to each of the plurality of categories previously stored in the first storage section; and an editing section for editing the second electronic album by storing at least a part of the image classified into the category detected by the category detection section among the plurality of images stored in the first storage section in association with one category.

The image information may include the image-capturing time and date of the image included in the electronic album. The first storage section may classify each of the plurality of images included in the first electronic album into the plurality of categories based on the time and date of the image and store therein the same along with previously storing for each category, image-capturing period information indicative of an image-capturing period including the image-capturing time and dates of all the images included in the category. The second storage section may classify each of the plurality of images included in the second electronic album into a plurality of categories based on the image-capturing time and date of the image and store therein the same. The range acquiring section may acquire the image-capturing period corresponding to one category based on the oldest image-capturing time and date and the latest image-capturing time and date among the image-capturing time and dates of the images included in the one category. The category detection section may detect the category corresponding to the image-capturing period at least partially overlapped with the image-capturing period acquired by the range acquiring section using the image-capturing period information corresponding to each of the plurality of categories previously stored in the first storage section. Additionally, the electronic album editing system further include an image information range presentation section for presenting an image-capturing period corresponding to the one category acquired by the range acquiring section to the user and an image-capturing period change control section for changing the image-capturing period presented by the image information range presentation section by a user. The category detection section may detect a category corresponding to the image-capturing period at least partially overlapped with the image-capturing period changed by the image-capturing period change control section using the image-capturing period information corresponding to each of the plurality of categories previously stored in the first storage section.

The image information may include the image-capturing point of the image included in the electronic album. The first storage section may classify each of the plurality of images included in the first electronic album into a plurality of categories based on the image-capturing point of each image and store therein the same along with previously storing image-capturing area information indicative of an image-capturing area including the image-capturing points of all the images included in the category. The second storage section may classify each of the plurality of images included in the second electronic album into a plurality of categories based on the image-capturing point of each image and store therein the same. The range acquiring section may acquire an image-capturing area corresponding to one category based on a polygon which includes the image-capturing points of all the images included in the one category and of which vertexes are selecting pointes selected from the image-capturing points of all the images, where each of the vertex angle is less than 180 degree. The category detection section may detect a category corresponding to the image-capturing area at least partially overlapped with the image-capturing area acquired by the range acquiring section using the image-capturing area information corresponding to each of the plurality of categories previously stored in the first storage section.

The electronic album editing system further includes an image information range presentation section for presenting an image-capturing area corresponding to the one category acquired by the range acquiring section and an image-capturing area change control section for changing the image-capturing area presented by the image information range presentation section by a user. The category detection section may detect a category corresponding to the image-capturing area at least partially overlapped with the image-capturing area changed by the image-capturing area change control section using the image-capturing area information corresponding to each of the plurality of categories previously stored in the first storage section. Additionally, the electronic album editing system further includes an image reclassification section for classifying the plurality of images included in the first storage section into the kinds of categories into which the plurality of images stored in the second storage section 2 are classified when the category detection section can not detect the category corresponding to the range similar to the range of the image information acquired by the range acquiring section due to the difference of the kinds between the categories into which the plurality of images stored in the first storage section are classified and the categories into which the plurality of images stored in the second storage section are classified. The category detection section may detect the category classified by the image reclassification section as a category corresponding to the range similar to the range acquired by the range acquiring section.

The category detection section may detect a category corresponding to one range information when the range indicated by the one range information among the plural pieces of range information previously stored in the first storage section is the only one range entirely included in the range acquired by the range acquiring section. The category detection section may detect a category corresponding to one range information when the range indicated by the one range information among the plural pieces of range information previously stored in the first storage section is the only one range at least partially overlapped with the range acquired by the range acquiring section. The category detection section may detect a category corresponding to one range information when the ratio between the size of the portion over which the range indicated by one range information is overlapped with the range acquired by the range acquiring section and the size of the range indicated by the one range information is more than a predetermined reference value.

According to a second aspect of the present invention, an electronic album editing method for editing an electronic album including a plurality of images is provided. A first storage section classifies each of a plurality of images included in a first electronic album into a plurality of categories based on image information indicative of the characteristic of each image and stores therein the same along with previously storing range information indicative of the range of image information corresponding to each of the plurality of categories. A second storage section classifies each of a plurality of images included in a second electronic album into a plurality of categories based on image information indicative of the characteristic of each image and stores therein the same. The electronic album editing method includes the steps of: selecting one category from a plurality of categories of the images store in the second storage section; acquiring the range of image information corresponding to one category from image information of the image included in the one category; detecting a category corresponding to the range similar to the range acquired in the range acquiring step using range information corresponding to each of a plurality of categories previously stored in the first storage section; and editing a second electronic album by storing in the second storage section at least a part of the image classified into the category detected in the category detecting step among the plurality of images stored in the first storage section in association with one category.

According to a third aspect of the present invention, an electronic album editing program for operating a computer to function as an electronic album editing system for editing an electronic album including a plurality of images. The electronic album editing system includes: a first storage section for classifying each of a plurality of images included in a first electronic album into a plurality of categories and storing therein the same along with previously storing range information indicative of the range of image information corresponding to each of the plurality of categories; a second storage section for classifying each of a plurality of images included in a second electronic album into a plurality of categories based on image information indicative of the characteristic of each image and storing therein the same; a category selection section for selecting one category from the plurality of categories of the images stored in the second storage section; a range acquiring section for acquiring the range of image information corresponding to one category from the image information of the image included in the one category; a category detection section for detecting a category corresponding the range similar to the range acquired by the range acquiring section using range information corresponding to each of the plurality of categories previously stored in the first storage section; and an editing section for editing the second electronic album by storing at least a part of the image classified into the category detected by the category detection section among the plurality of images stored in the first storage section in association with one category.

Here, all necessary features of the present invention are not listed in the summary of the invention. The sub-combinations of the features may become the invention.

According to the present invention, images included in one electronic album are efficiently added to the other album while the category into which the images are classified in the electronic album is considered, so that the other album can be edited.

BRIEF DESCRIPTION OF THE DRAWINGS

FIG. 2 shows a first storage section 100;

FIG. 3 shows a second storage section 110;

FIG. 9 shows another example of the first storage section 100;

FIG. 10 shows another example of the second storage section 110;

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
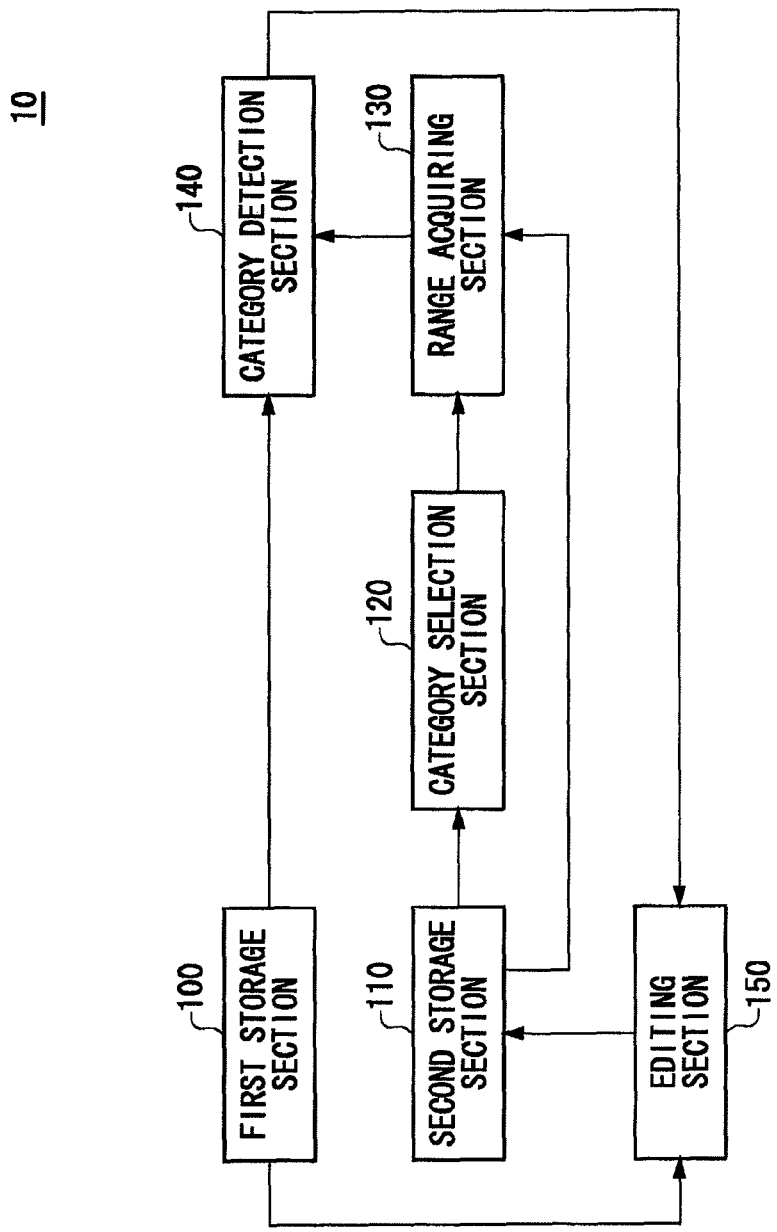
FIG. 1 is a block diagram showing a functional configuration of an electronic album editing system 10.

FIG. 1 shows an example of a functional configuration of an electronic album editing system 10. The electronic album editing system 10 includes a first storage section 100, a second storage section 110, a category selection section 120, a range acquiring section 130, a category detection section 140 and an editing section 150. The electronic album editing system 10 edits an electronic album including a plurality of images. Here, the first storage section 100 stores a plurality of images included in a first electronic album, and the second storage section 110 stores a plurality of images included in a second electronic album. Then, the electronic album editing system 10 edits the electronic album by adding at least part of the image stored in the first storage section 100 to the second storage section 110 and storing therein the same.

The electronic album editing system according to the present embodiment previously calculate the range of image information indicative of the characteristic of the image for each of the plurality of categories in the first electronic album when each of the images are classified into a plurality of categories in the first electronic album and the second electronic album. Therefore, the image required for adding to the second electronic album by the user can be efficiently selected from the first electronic album along with adding the selected image to the second electronic album, so that the second electronic album can be edited.

The first storage section 100 classifies each of the plurality of images included in the first electronic album into a plurality of categories based on image information indicative of the characteristic of the image and stores therein the same along with previously storing range information indicative of the range of image information corresponding to each of the plurality of categories. Here, the image information may be information indicative of the image-capturing time and date of an image, and may be information indicative of the image-capturing point of an image. The rage of image information may be, for example when the image information is the image-capturing time and date of the image, a period including the image-capturing time and dates of all the images included in the category, that is an image-capturing period. Additionally, range information may be information including the starting time and date and the end time and date of the image-capturing period. The first storage section 100 may be a magnetic memory device such as a hard disk drive, a semiconductor recording medium such as a flash memory, an optical recording medium such as a CD-R or the other recording medium.

The second storage section 110 classifies each of the plurality of images included in the second electronic album into a plurality of categories based on image information indicative of the characteristic of the image and stores therein the same. Here, the second storage section may be a magnetic memory device such as a hard disk drive, a semiconductor recording medium such as a flash memory, an optical recording medium such as a CD-R or the other recording medium. The category selection section 120 selects one category from the plurality of category of the image stored in the second storage section 110 and outputs information indicative of the selected category to the range acquiring section 130. The range acquiring section 130 acquires the range of image information corresponding to the category selected by the category selection section 120 from the image information of the image included in the category. Then, the range acquiring section 130 outputs the information indicative of the acquired range of image information to the category detection section.

The category detection section 140 detects a category corresponding to the range similar to the range of image information acquired by the range acquiring section 130 using the range information corresponding to each of the plurality of categories previously stored in the first storage section. Then, the category detection section 140 outputs information indicative of the detected category to the editing section 150. The editing section 150 edits the second electronic album by storing at least part of the image classified into the category detected by storing in the second storage section the category detection section 140 in association with the category selected by the category selection section 120.

The electronic album editing system according to the present embodiment can extract the image classified into the category similar to the category selected in the second electronic album and add the same to the second electronic album when the second electronic album is edited by adding the image included in the first electronic album to the second electronic album. That is to say, the image added to the second electronic album is not relate to the image included in the selected category at all but the image similar to the image information indicative of the image. Therefore, the electronic album editing system 10 can automatically extract the image required for adding to the selected category by the user such as the photographer of the second electronic album from the first electronic album and add the same to the second electronic album. In other words, the photographer of the second electronic album can add the desirable image to the second electronic album to edit the second electronic album by using the electronic album editing system 10 without the other working, such as retrieving the image to be added to the second electronic album as viewing the number of images included in the first electronic album. Additionally, when the photographer of the first electronic album and that of the second electronic album are same parson, a complicated combining work of the electronic album such that as for the images in the electronic albums which are individually generated and managed, the images in a certain category are collectively managed while the images in the other categories are individually managed in the future can be efficiently executed by using the electronic album editing system 10.

Additionally, the electronic album editing system according to the present embodiment previously calculates the range of image information corresponding to each of the categories in the first electronic album and stores the same in the first storage section. Therefore, the range of the category in the first storage section similar to the range of category selected by the category selection section 120 in the second storage section 110 can more efficiently detect in comparison with calculating according to need. Therefore, even if a plurality of electronic albums are used as a first electronic album and the image extracted from any of the plurality of electronic album is added to the second electronic album to edit the same, the category in the first electronic album corresponding to the category selected in the second electronic album among the number of categories in the plurality of electronic albums can be efficiently detected at short times.

FIG. 2 shows an example of a first storage section 100 according to the present embodiment. FIG. 3 shows an example of a second storage section 110 according to the present embodiment. In this example, image information indicative of the characteristic of the image included in the electronic album includes the time and date at which the image is captured. Accordingly, the range of image information includes the period for which the image is captured.

As shown in FIG. 2, the first storage section 100 classifies each of plurality of images included in the first electronic album into a plurality of categories (200, 210, . . . ) based on the time and date at which each image is captured and stored therein the same. For example, the first storage section 100 stores classifies images as an image 212 and an image 214 . . . into the category 200. Then, the first storage section 100 previously stores image-capturing period information indicative of the image-capturing period including the image-capturing time and dates of all the images included in the category for each of the plurality of categories as the range information of the category. Specifically, the first storage section 100 previously stores image-capturing period information including the starting time and date and the end time and date within the image-capturing period for each of the plurality of categories.

Meanwhile, as shown in FIG. 3, the second storage section 110 classifies each of the images included in the second electronic image into a plurality of categories (300, 310 . . . ) based on the time and date at which each image is captured. For example, the second storage section 110 classifies the images as an image 302, an image 304 . . . into the category 300. Additionally for example, the second storage section 110 classifies the images as an image 312 and an image 314 . . . into a category 310. Further, the second storage section 110 stores image-capturing time and date information indicative of the time and date at which the image is captured in association with each of the images.

Then, the range acquiring section 130 acquires the image-capturing time and date corresponding to the category selected by the category selection section 120 based on the oldest image-capturing time and date and the latest image-capturing time and date among the image-capturing time and dates of the images included in the category. For example, the range acquiring section 130 may acquire a period each of which end point is the oldest image-capturing time and date and the latest image-capturing time and date as the image-capturing period. Then, the category detection section 140 detects a category corresponding to the image-capturing period at least partially overlapped with the acquired image-capturing period as the category corresponding to the image-capturing period similar to the image-capturing period acquired by the range acquiring section 130 using image-capturing period information corresponding to each of the plurality of categories which are previously stored in the first storage section 100.

The electronic album editing system 10 according to the present embodiment can edit the second electronic album by adding the image related to the image in the selected category. For example, an image captured in the season same as the image classified in the category selected in the second electronic album among the images included in the first electronic album is added to the second electronic album when images are classified in each of the first electronic album and the second electronic album based on the image-capturing time and date. Additionally, when the photographer of each of the electronic album is same, images captured around the same time can be collectively managed so that an editing work can be efficiently performed.

Figure 4:
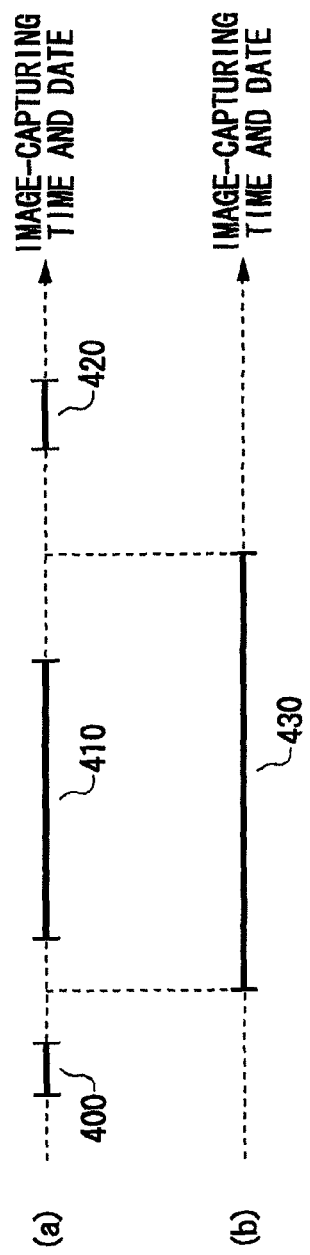
FIG. 4 shows a first example of a processing in a category detection section 140.
Figure 5:
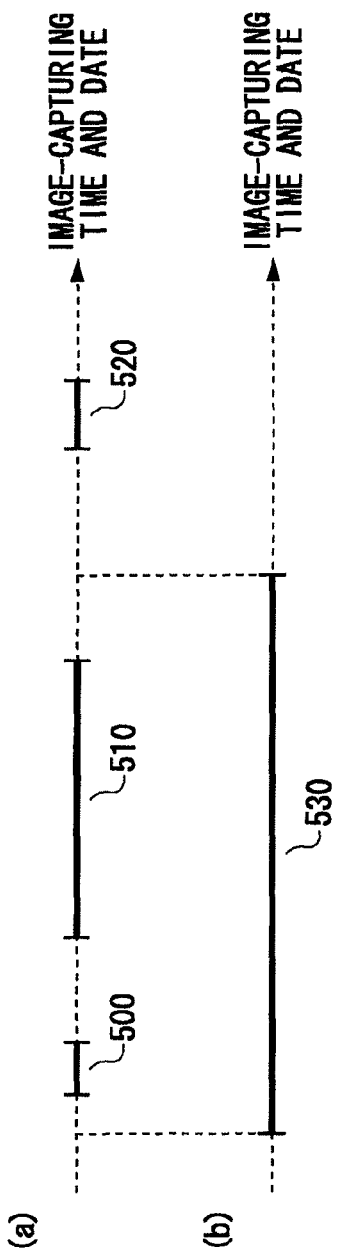
FIG. 5 shows a second example of a processing in a category detection section 140.

FIG. 4 shows a first example of a processing in a category detection section 140 according to the present embodiment. Here, FIG. 4A shows an example of a range corresponding to each of the categories in the first storage section according to an embodiment of the present invention. FIG. 4B shows a range corresponding to the category in the second storage section 110 according to an embodiment of the present invention. Additionally, FIG. 5 shows a second example of a processing in the category detection section 140 according to an embodiment of the present invention. Here, FIG. 5A shows an example of a range corresponding to each of the categories in the first storage section 100 according to an embodiment of the present invention. FIG. 5B shows a range corresponding to the category in the second storage section 110 according to an embodiment of the present invention.

In this example, the first storage section 100 and the second storage section 110 classify each of the plurality of images included in the electronic album into a plurality of categories based on each time and date at which the image is captured as described with reference to FIG. 2 and FIG. 3. However, in the following description, images may be classified based on not only each image-capturing time and date but also the other image information.

As described above with reference to FIG. 2 and FIG. 3, the category detection section 140 detects a category corresponding to the image-capturing period at least partially overlapped with the image-capturing period acquired by the range acquiring section 130 among the image-capturing period for each category previously stored in the first storage section 100 as a category similar to the category selected by the category selection section 120. However, when any category is detected under only the condition whether the image-capturing period is at least partially overlapped, the similarity between the detected category and the category selected by the category selection section 120 is not enough. Accordingly, the photographer of the second electronic album sometimes feels that the image classified into the detected category is not suitable for adding to the selected category. Therefore, it is preferred that the category detection section 140 detects a category more similar to the selected category and adds more appropriate image to the second electronic album. Thus, now it will be described that the category detection section 140 detects a category more similar to the selected category with reference to FIG. 4 and FIG. 5.

The category detection section 140 detects a category corresponding to one image-capturing period information when an image-capturing period indicated by the one image-capturing information among plural pieces of image-capturing period information previously stored in the first storage section 100 is the only image-capturing period entirely included in the image-capturing period acquired by the range acquiring section 130. Now, a specific example is shown using FIG. 4. The first storage section 100 classifies at least a part of images included in the first electronic album into a category corresponding to each of an image-capturing period 400, an image-capturing period 410 and an image-capturing period 420 which are different from each other and stores therein the same in FIG. 4. Here, the category section 120 selects one category in the second electronic album. The range acquiring section 130 acquires an image-capturing period 430 as the image-capturing period corresponding to the selected category. In this case, the category detection section 140 detects a category corresponding to the image-capturing period 410 as the category similar to the category selected by the category selection section 120 by determining that the image-capturing period 410 is the only image-capturing period entirely included in the image-capturing period 430 among the image-capturing periods corresponding to each of the categories in the first storage section 100.

Next, another specific example is shown using FIG. 5. The first storage section 100 classifies at least a part of images included in the first electronic album into categories corresponding to each of an image-capturing period 500, an image-capturing period 510 and an image-capturing period 520 which are different from each other and stores therein the same in FIG. 5. Here, the category selection section 120 selects one category in the second electronic album. The range acquiring section 130 acquires the image-capturing period 430 as the image-capturing period corresponding to the selected category. In this case, the category detection section 140 detects the image-capturing period too and the image-capturing period 510 as the image-capturing period at least partially overlapped with the image-capturing period 530. However, the category detection section 140 can not detect the only image-capturing period because all of the detected image-capturing period are entirely included in the image-capturing period 530. Accordingly, the category detection section 140 does not detect any category similar to the selected category so that the editing section 150 does not edit the second electronic album. In this case, the electronic editing album system 10 may present information indicative of each of the categories corresponding to the plurality of image-capturing periods entirely included in the image-capturing period 530 to the user and cause the user to designate which is category from which an image to be added to the second electronic album is extracted.

The electronic album editing system 10 according to the present embodiment can automatically extract an image to be added to the second electronic album when the a category more similar to the selected category is uniquely determined by automatically detecting the category corresponding to the only range entirely included in the range corresponding to the selected category as the category from which the image to be added to the second electronic album is extracted. Therefore, the image required for adding to the selected category in the second electronic album by the user can be extracted without any work by the user and added to the second electronic album.

Figure 6:
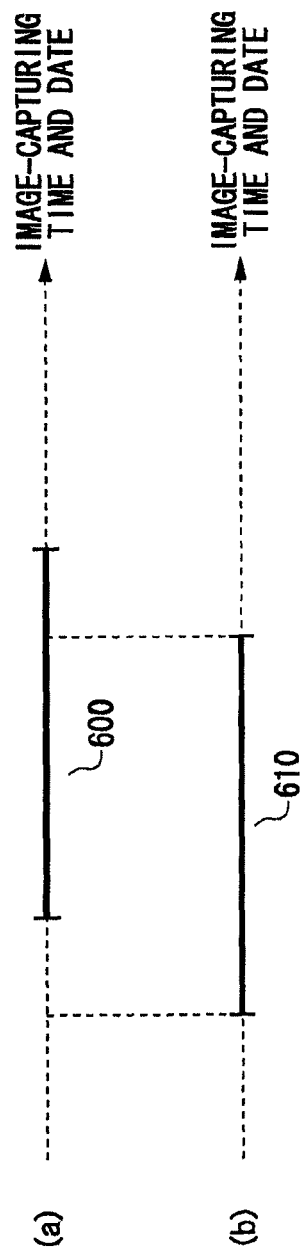
FIG. 6 shows a third example of a processing in a category detection section 140.
Figure 7:
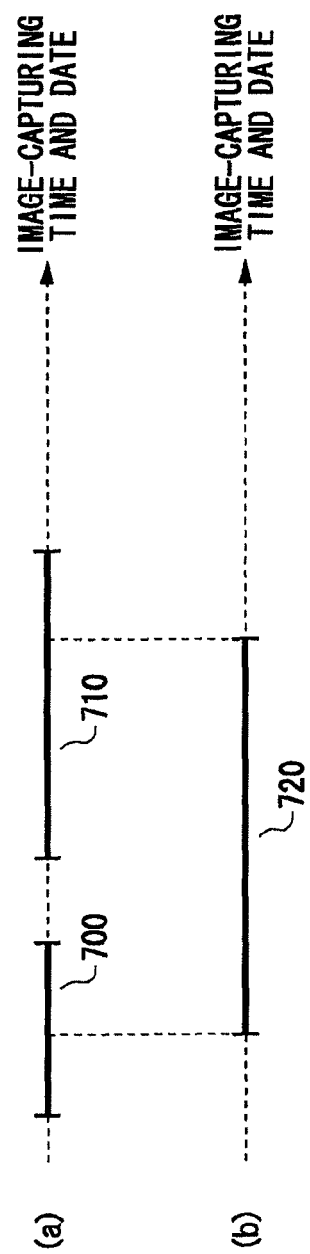
FIG. 7 shows a fourth example of a processing in a category detection section 140.
Figure 8:
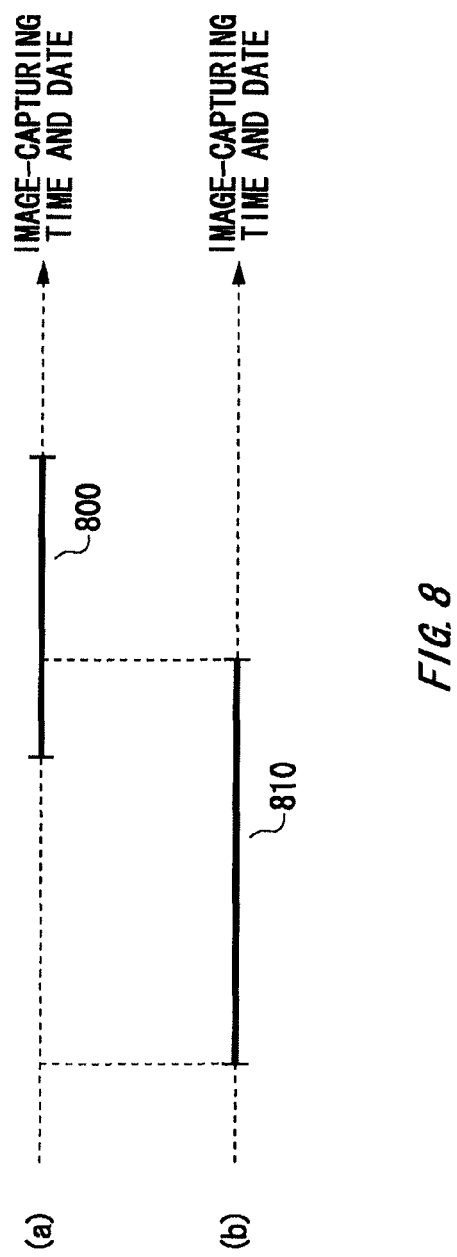
FIG. 8 shows a fifth example of a processing in a category detection section 140.

FIG. 6 shows a third example of a processing in a category detection section 140 according to the present embodiment. Here, FIG. 6A shows an example of a range corresponding to each of the categories in the first storage section 100 according to an embodiment of the present invention. FIG. 6B shows a range corresponding to the category in the second storage section 110 according to an embodiment of the present invention. Additionally, FIG. 7 shows a fourth example of a processing in the category detection section 140 according to an embodiment of the present invention. Here, FIG. 7A shows an example of a range corresponding to each of the categories in the first storage section 100 according to an embodiment of the present invention. FIG. 7B shows a range corresponding to the category in the second storage section 110 according to an embodiment of the present invention. Additionally, FIG. 8 shows a fifth example of a processing in the category detection section 140 according to an embodiment of the present invention. Here, FIG. 8A shows an example of a range corresponding to each of the categories in the first storage section 100 according to an embodiment of the present invention. FIG. 8B shows a range corresponding to the category in the second storage section 110 according to an embodiment of the present invention. Hereinafter, another example that the category detection section 140 detects the category more similar to the category selected by the category selection section 120 will be described with reference to FIG. 6, FIG. 7 and FIG. 8.

The category detection section 140 detects a category corresponding to one image-capturing period information as the category similar to the category selected by the category selection section 120 when the image-capturing period indicated by the one image-capturing period information among the plurality of image-capturing period information previously stored in the first storage section 100 is the only image-capturing period at least partially overlapped with the image-capturing period acquired by the range acquiring section 130. Additionally, the category detection section 140 may further detect a category corresponding to the one image-capturing period information as the category similar to the selected category when the ratio between the length of the portion over which the image-capturing period indicated by the one image-capturing period information is overlapped with the image-capturing period acquired by the range acquiring section 130 and the length of the image-capturing period indicated by the one image-capturing period information is more than a predetermined reference value.

Now, a specific example is shown using FIG. 6. The first storage section 100 classifies at least a part of images included in the first electronic album into categories corresponding to an image-capturing period 600 in FIG. 6. Here, the category selection section 120 selects one category in the second electronic album. The range acquiring section 130 acquires an image-capturing period 610 as the image-capturing period corresponding to the selected category. In this case, the category detection section 140 detects a category corresponding to an image-capturing period 600 as the category similar to the category selected by the category selection section 120 by determining that the image-capturing period 600 is the only image-capturing period at least partially overlapped with the image-capturing period 610. Additionally, the category detection section 140 further detects a category corresponding to the image-capturing period 600 as the category similar to the category selected by the category selection section 120 by determining that the ratio between the length of the portion over which the image-capturing period 600 is overlapped with the image-capturing period 610 and the length of the image-capturing period 600 is more than a predetermined reference value such as 0.5. Here, the predetermined reference value may be the lower limited value of the ratio of the overlapped portion allows the user to feel that each of the image-capturing time and date of the image classified into a image-capturing period A and an image-capturing period B are sufficiently related each other, where, the image-capturing period A is acquired corresponding to the category selected by the category 120, and the image-capturing period B is at least partially overlapped with the image-capturing period A. Additionally, the value may be previously determined by the user such as 0.5.

Next, another specific example is shown using FIG. 7. The first storage section 100 classifies at least a part of images included in the first electronic album into categories corresponding to each of an image-capturing period 700 and an image-capturing period 710, and stores therein the same in FIG. 7. Here, the category selection section 120 selects one category in the second electronic album. The range acquiring section 130 acquires an image-capturing period 720 as the image-capturing period corresponding to the selected category. In this case, the category detection section 140 can not detect the only image-capturing period because the category detection section 140 detects the image-capturing period 700 and the image-capturing period 710 as the image-capturing period at least partially overlapped with the image-capturing period 720. Accordingly, the category detection section 140 does not detect any category similar to the selected category, so that the editing section 150 does not edit the second electronic album.

The electronic album editing system 10 according to the present invention can automatically extract the image to be added to the second electronic album when the category more similar to the selected category is uniquely determined by automatically detecting the category corresponding to the only range at least partially overlapped with the range corresponding to the selected category as the category from which the image to be added to the second electronic album should be extracted. Therefore, the image desired for adding to the selected category in the second electronic album by the user can be extracted without any work by the user and added to the second electronic album.

Next, another specific example is shown using FIG. 8. The first storage section 100 classifies at least a part of images included in the first electronic album into categories corresponding to an image-capturing period 800 and stores therein the same in FIG. 8. Here, the category selection section 120 selects one category in the second electronic album. The range acquiring section 130 acquires an image-capturing period 810 as the image-capturing period corresponding to the selected category. In this case, the category detection section 140 determines that the image-capturing period 800 is the only image-capturing period at least partially overlapped with the image-capturing period 810. However, the category detection section 140 also determines that the ratio between the length of the portion over which the image-capturing period is overlapped with the image-capturing period 810 and the length of the image-capturing period 800 is not more than a predetermine reference value such as 0.5. Accordingly, the category detection section 140 does not detect any category similar to the category selected by the category selection section 120, so that the editing section 150 does not edit the second electronic album.

The electronic album editing system 10 according to the present embodiment can accurately detect a category more similar to the selected category by automatically detecting the category corresponding to the range which is the only range at least partially overlapped with the range corresponding to the selected category and of which ratio of the overlapped portion is more than the reference value as a category from which the image to be added to the second electronic album should be extracted.

FIG. 9 shows another example of the first storage section 100 according to the present embodiment. FIG. 10 shows another example of the second storage section 110 according to the present embodiment. Additionally, FIG. 11 shows a processing of a range acquiring section 130 according to the present embodiment. In this example, image information indicative of the characteristic of the image included in the electronic album includes the image-capturing point at which the image is captured. Accordingly, the range of image information includes the area at which the image is captured.

As shown in FIG. 9, the first storage section 100 classifies each images included in the first electronic album into a plurality of categories (900, 910 . . . ) based on each image-capturing time and date and stores therein the same. For example, the first storage section 100 classifies the images as an image 902 and an image 904 . . . into a category 900. Additionally for example, the first storage section 100 classifies the images as an image 912 and an image 914 in a category 910. Then, the first storage section 100 previously stores image-capturing area information indicative of the image-capturing area including the image-capturing point of all the images included in the category for each of the plurality of categories. Specifically, the first storage section 100 previously stores the longitude and latitude of each vertex of a polygon in the image-capturing area which are defined as the polygon corresponding to each of the plurality of categories.

Meanwhile, as shown in FIG. 10, the second storage section 110 classifies each images included in the second electronic album into a plurality of categories (1000, 1100, . . . ) based on each image-capturing time and date. For example, the second storage section 110 classifies the images as an image 1002, an image 1004, . . . ) into the category 1000. Additionally for example, the second storage section 110 classifies the images as an image 1012, an image 1014, . . . ) into a category 1010. Further the second storage section 110 stores image-capturing point information indicative of the point at which the image is captured, specifically, the longitude and latitude of the image-capturing point in association with each of the images.

Figure 11A:
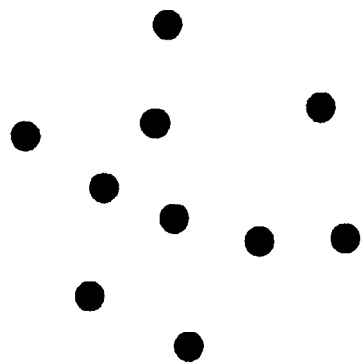
FIGS. 11A and 11B show a processing of a range acquiring section 130.
Figure 11B:
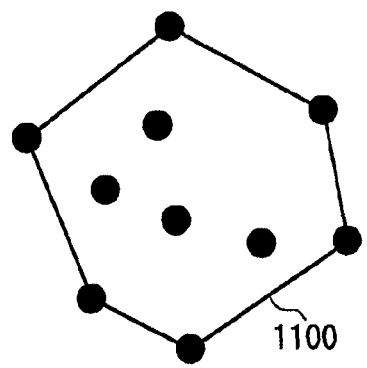

Now, an processing that the range acquiring section 130 acquires an image-capturing point corresponding to the category selected by the category selection section 120 will be described. Here, FIG. 11A shows an example of the distribution of the image-capturing points in each of the images included in the category selected by the category selection section 120. FIG. 11B shows a range 1100 being an example of a range acquired by the range acquiring section 130. The range acquiring section 130 acquires an image-capturing area corresponding to the category selected by the category selection section 120 based on based on a polygon which includes the image-capturing points of all the images included in the selected category and of which vertexes are selecting pointes selected from the image-capturing points of all the images, where each of the vertex angle is less than 180 degree. Specifically, when the image-capturing points of the image included in the category are distributed as shown in FIG. 11A, the range acquiring section 130 acquires the range 1100 being the polygon shown in FIG. 11B as the outer edge of the image-capturing area corresponding to the selected category.

Then, the category detection section 140 detects a category corresponding to the image-capturing area at least partially overlapped with the acquired image-capturing area as the category corresponding to the image-capturing area similar to the image-capturing area acquired by the range acquiring section 130 using image-capturing area information corresponding to each of the plurality of categories previously stored in the first storage section 100. Here, the category detection section 140 may also detect the category more similar to the selected category when the image information is the image-capturing point as well as the above-described case that the image information is the image-capturing time and date.

The electronic album editing system 10 according to the present embodiment can edit the second electronic album by adding the image related to the image in the selected category. For, example, when images for each travel destination are classified in each of the first electronic album and the second electronic album, the image captured at the travel destination same as the travel destination in the category selected in the second electronic album is added to the second electronic album. Additionally, when the photographer of each electronic album are same, images captured at the same travel destination can be collectively managed, so that an editing work can be efficiently performed.

Figure 12:
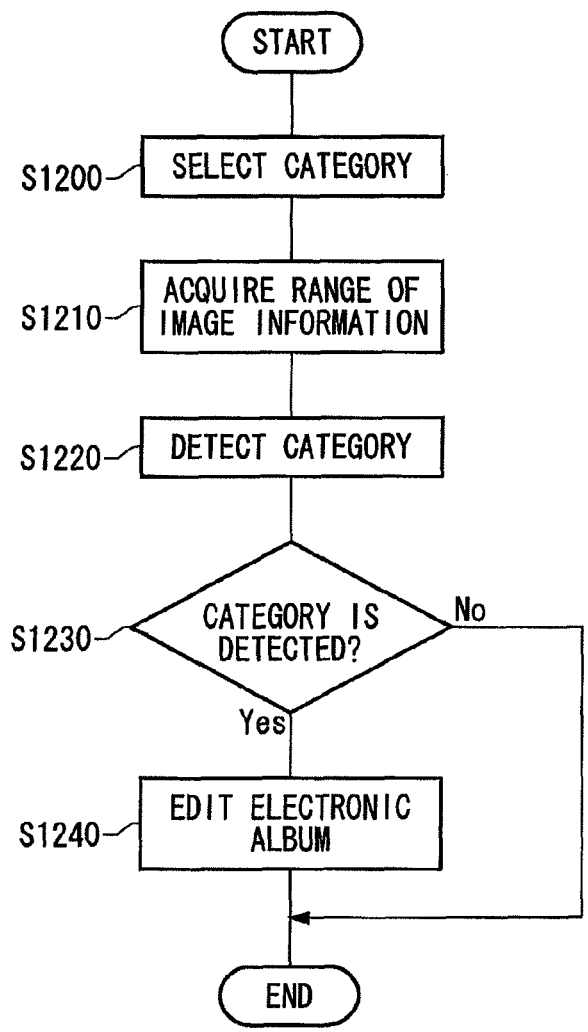
FIG. 12 shows a flowchart of a processing of an electronic album editing system 10.

FIG. 12 shows a flowchart of a processing of an electronic album editing system 10 according to the present embodiment. Firstly, the category selection section 120 selects one category from a plurality of categories of the image stored in the second storage section 110 (S1200). For example, the category selection section 120 may edit the second electronic album by sequentially selecting the plurality of categories in the second electronic album and causing the editing section 150 to take the images of all the categories in the other electronic album in the electronic album editing system 10. Additionally for example, the category selection section 120 may present information indicative of all the categories in the second electronic album to the user such as the photographer of the second electronic album and select the category designated by the user. Next, the range acquiring section 130 acquires the range of image information corresponding to the category selected by the category selection section 120 from the image information of the image included in the category (S1210). Next, the category detection section 140 determines whether a category corresponding to the range similar to the range acquired by the range acquiring section 130 is detected (S1230). Then, when it is determined that the category detection section 140 detects the category (S1230: Yes), the editing section 150 edits the second electronic album by storing in the second storage section 110 at least a part of image classified in the detected category among the plurality of images stored in the first storage section 100 in association with the category selected by the category selection section 120 (S1240).

Figure 13:
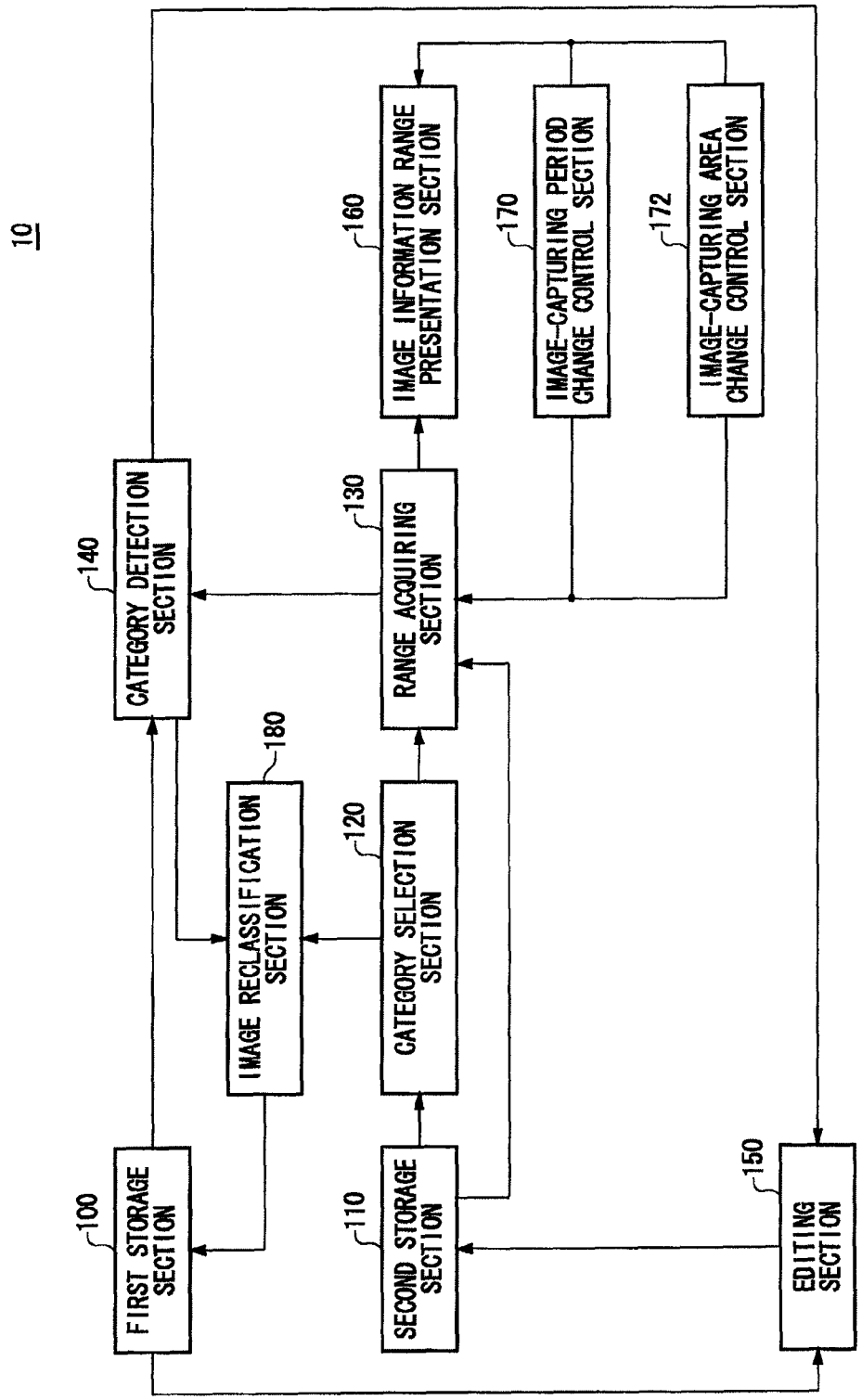
FIG. 13 a block diagram showing a functional configuration of the electronic album editing system 10.

FIG. 13 shows a functional configuration of the electronic album editing system 10 to according to the present embodiment. The electronic album editing system further includes an image information range presentation section 160, an image-capturing period change control section 170, an image-capturing area change control section 172 and an image reclassification section 180. The category selection section 120 further outputs the kind of one category selected from a plurality of categories in the images stored in the second storage section 110 to the image reclassification section 180. Additionally, the range acquiring section 130 acquires the range of image information corresponding to one category selected by the category selection section 120 from image information of the image included in the one category and further outputs the acquired range of image information to the image information range presentation section 160. Here, the image information may include the image-capturing time and date and the image-capturing point of the image included in the electronic album. The image information range presentation section 160 presents an image-capturing period corresponding to one category acquired by the rage acquiring section 130 to the user. Specifically, the image information range presentation section 160 receives from the range acquiring section 130 an image-capturing period acquired by the range acquiring section 130 from the oldest image-capturing time and date and the latest image-capturing time and date among the image-capturing time and dates of the images included in one category. Then, the image information range presentation section 160 displays the received image-capturing period on a display section such as a monitor.

The image-capturing period change control section 170 cause the user to change an image-capturing period presented by the image information presentation section 160. Then, the image-capturing period change control section 170 outputs the image-capturing period changed by the user to the range acquiring section 130. The range acquiring section 130 may replace the image-capturing period received from the image-capturing period change control section 170 with the image-capturing period of one category received from the category selection section 120 to set the latter as a new image-capturing period for the one category. Additionally, the image-capturing period change control section 170 may output the result of the image-capturing period changed by the user to the image information range presentation section 160 and causes the image information range presentation section 160 to present the changed image-capturing period to the user. The range acquiring section 130 outputs the image-capturing period received from the image-capturing period change control section 170 to the category detection section 140. The category detection section 140 detects a category corresponding to the image-capturing period at least partially overlapped with the image-capturing period changed by the image-capturing period change control section 170 using the image-capturing period information corresponding to each of the plurality of categories previously stored in the first storage section 100.

The electronic album editing system 10 according to the present embodiment can present the image-capturing period for the category acquired by the range acquiring section 130 to the user and then, the user can change the presented image-capturing period. Additionally, the electronic album editing system 10 can detect a category corresponding to the image-capturing period changed by the user. Thereby at least a part of image-capturing period can be changed to an image-capturing period desired by the user in order that the category 140 can detect the category including the image captured within the image-capturing period desired by the user. Therefore, the electronic album editing system 10 according to the present embodiment can contribute to appropriately store in the electronic album of the user any image at the image-capturing time and date at which the user can not be captured the image.

The image information range presentation section 160 may present an image-capturing area corresponding to one category acquired by the range acquiring section 130 to the user. Specifically, the image information range presentation section 160 receives from the range acquiring section 130 an image-capturing area calculated by forming a polygon which includes the image-capturing points of all the images included in the one category and of which vertexes are selecting points selected from the image-capturing points of all the images, where each of the vertex angle is less than 180 degree as an image-capturing area including all the image-capturing points at which the plurality of images included in one category are captured. Then, the image information range presentation section 160 displays the received image-capturing area on a display section such as a monitor.

The image-capturing area change control section 172 causes the user to change the image-capturing area presented by the image information range presentation section 160. Then, the image-capturing area change control section 172 outputs the image-capturing area changed by the user to the range acquiring section 130. The range acquiring section 130 may set the image-capturing area received from the image-capturing area change control section 172 to a new image-capturing area in the one category instead of the image-capturing area of the category of the position received from the category selection section 120. Additionally, the image-capturing area change control section 172 may output the result of the image-capturing area changed by the user to the image information range presentation section 160 and cause the image information range presentation section 160 to present the changed image-capturing area to the user. The range acquiring section 130 outputs the image-capturing area received from the image-capturing area change control section 172 to the category detection section 140. The category detection section 140 detects a category corresponding to the image-capturing area at least a partially overlapped with the image-capturing area changed by the image-capturing area change control section 172 using the image-capturing area information corresponding to each of the plurality of categories stored in the first storage section 100.

The electronic album editing system 10 according to the present embodiment can present the image-capturing area of the category acquired by the range acquiring section 130 to the user, and then, the user can change the presented image-capturing area. Additionally, the electronic album editing system 10 can detect a category corresponding to the image-capturing area changed by the user. Thereby at least a part of image-capturing area can be changed to an image-capturing area desired by the user in order that the category 140 can detect the category including the image captured within the image-capturing area desired by the user. Therefore, any image at the image-capturing point at which the user can not capture the image can even appropriately store in the electronic album of the user.

Additionally, in the case that the category detection section 140 can not detect any category corresponding to the range similar to the range of the image information received from the range acquiring section 130 when the kinds of the categories into which the plurality of images stored in the first storage section 100 are classified are different from the kinds of the categories into which the plurality of images stored in the second storage section 110 are classified, the image reclassification section 180 classifies the plurality of images included in the first electronic album into the kinds of the categories into which the plurality of images stored in the second storage section 110 are classified.

Specifically, when the category detection section 140 does not detect from the first storage section any category corresponding to the range of image information received from the range acquiring section 130, the category detection section 140 outputs information on being not detecting to the image reclassification section 180. When the image reclassification section 180 receives information that the category detection section 140 can not detect, the image reclassification section 180 classifies the plurality of images stored in the first storage section 100 into the category of which kind is same as that of the categories received from the category selection section 120. Then, the category detection section 140 detects the category classified by the image reclassification section 180 as a range similar to the range acquired by the range acquiring section 130.

The electronic album editing system according to the present embodiment can classify the plurality of images stored in the first storage section 100 into the category same as that of the category stored in the second storage section and detect the same when the user can not acquire the image included in the desired category because the kinds of the categories stored in the second storage section 110 are different from that of the categories stored in the first storage section. Therefore, the user can certainly acquire the image included in the desired category. Thus the electronic album editing system according to the present embodiment can contribute to satisfy the contents of the user's electronic album.

Figure 14:
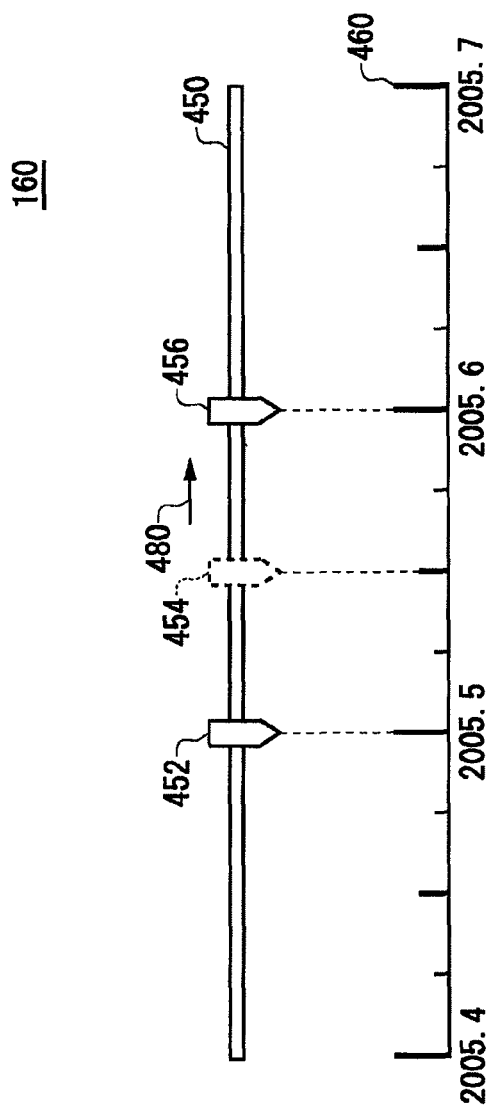
FIG. 14 shows an image information range presentation section 160.

FIG. 14 shows an image information range presentation section 160 according to the present embodiment. The image information range presentation section 160 presents an image-capturing period corresponding to one category acquired by the range acquiring section 130 to the user. For example, the image information range presentation section 160 may divide the image-capturing period into the predetermined periods and display the same as a scale 460. Then, the image-capturing period change control section 170 cause the user to change the image-capturing period presented by the image information range presentation section 160. Specifically, the image-capturing period change control section 170 may display a bar 450 on the image information range presentation section 160 and cause the user to operate a slider 452 and a slider 456 to change the image-capturing period.

For example, the image-capturing period acquired by the range acquiring section 130 is from the beginning of May, 2005 to the middle of May, 2005, the image information range presentation section 160 firstly displays the slider 452 at the position of the beginning of May, 2005 in the scale 460, and then, displays the slider 454 at the position of the middle of May, 2005. Next, the image-capturing period change control section 170 may cause the user to shift the slider 454 to the position of the slider 456 in the direction an arrow 480 when the user desires that the image-capturing period is changed to the period from the beginning of May, 2005 to the beginning of June, 2005. Therefore, the image-capturing period change control section 170 can change the image-capturing period to an image-capturing period desired by the user. Here, the image-capturing period may be an image-capturing date (year-month-day) in minutes. Additionally, the image information range presentation section 160 may display not only by the scale but also by such as a calendar.

The electronic album editing system 10 according to the present embodiment can change the image-capturing period of the category acquired by the range acquiring section 130 by the user. Then, the category detection section 140 can detect a category corresponding to the image-capturing period changed by the user from the first storage section 100. Therefore, the user can extract from the first storage section an image captured at the time and date at which the user forgot to capture images and can not capture images due to occurring any problem of the image-capturing apparatus, and can store the same in the user's electronic album. Therefore, it can improve the satisfaction of the user on editing the electronic album.

Figure 15:
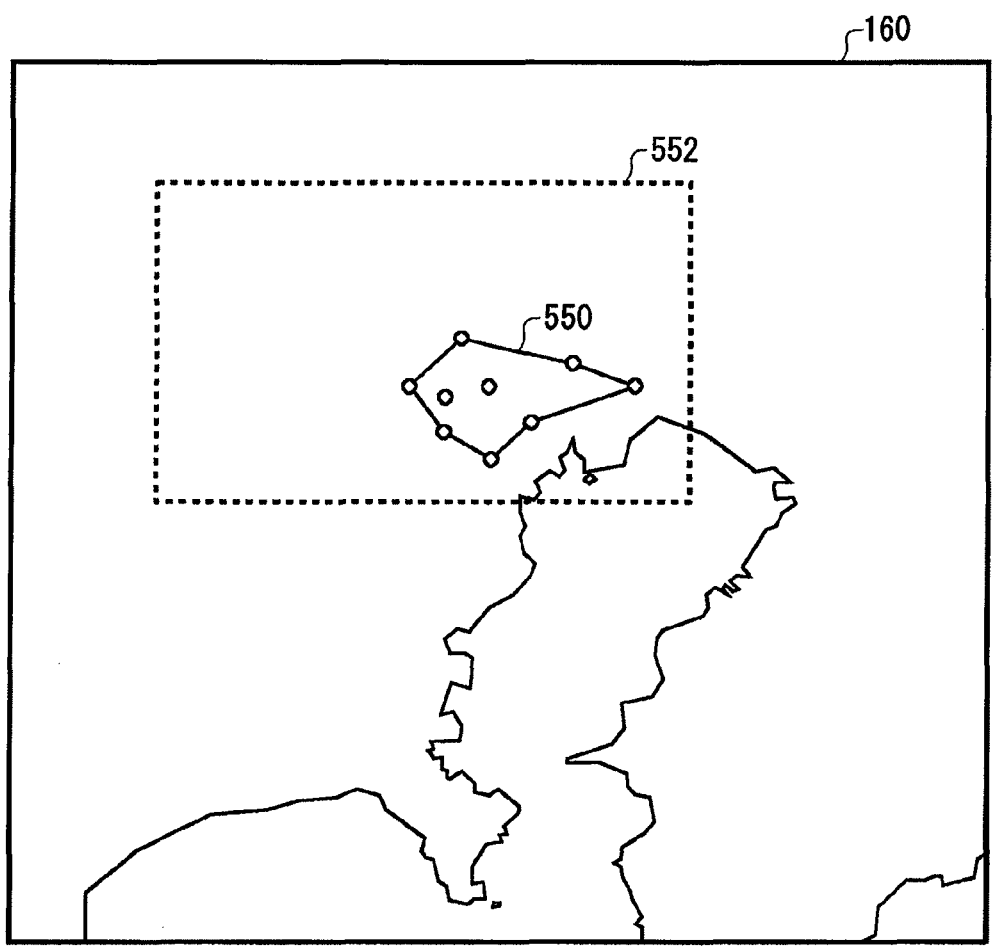
FIG. 15 shows an image information range presentation section 160.

FIG. 15 shows an image information range presentation section 160 according to the present embodiment. The image information range presentation section 160 presents an image-capturing area corresponding to one category acquired by the range acquiring section 130 to the user. For example, the image information range presentation section 160 displays a map including the image-capturing area acquired by the range acquiring section 130 on a display section such as a monitor. Then, the image information range presentation section 160 may display a plurality of image-capturing points at which the user captures the images along with displaying a range 550 including all the plurality of image-capturing points. Then, the image-capturing area change control section 172 causes the user to change the image-capturing area presented by the image information range presentation section 160. Specifically, the image-capturing area change control section 172 may cause the user to change the image-capturing area on the map.

For example, the image-capturing area change control section 172 may cause the user to enlarge the range of the image-capturing area from the area 550 to an area 552 in order that the image-capturing area includes an area larger than the area 550. Here, the image-capturing area change control section 172 may cause the user to change the range of the image-capturing area in order that include the image-capturing area includes an area smaller than the area 550. In this case, the image-capturing area change control section 172 may cause the user to enlarge/reduce the range of the area 552 by an input device such as a mouse. Additionally, the image-capturing area change control section 172 may cause the user to change the range of the area 550 by shifting the image-capturing point displayed on the map by the mouse to enlarge/reduce the image-capturing area.

The electronic album editing system 10 according to the present embodiment can change the image-capturing area of the category acquired by the range acquiring section 130 by the user. Then, the category detection section 140 can detect a category corresponding to the image-capturing area changed by the user from the first storage section 100. Therefore, the user can extract from the first storage section an image captured at the time and date at which the user forgot to capture images and can not capture images due to occurring any problem of the image-capturing apparatus, and can store the same in the user's electronic album. Therefore, it can improve the satisfaction of the user on editing the electronic album.

Figure 16:
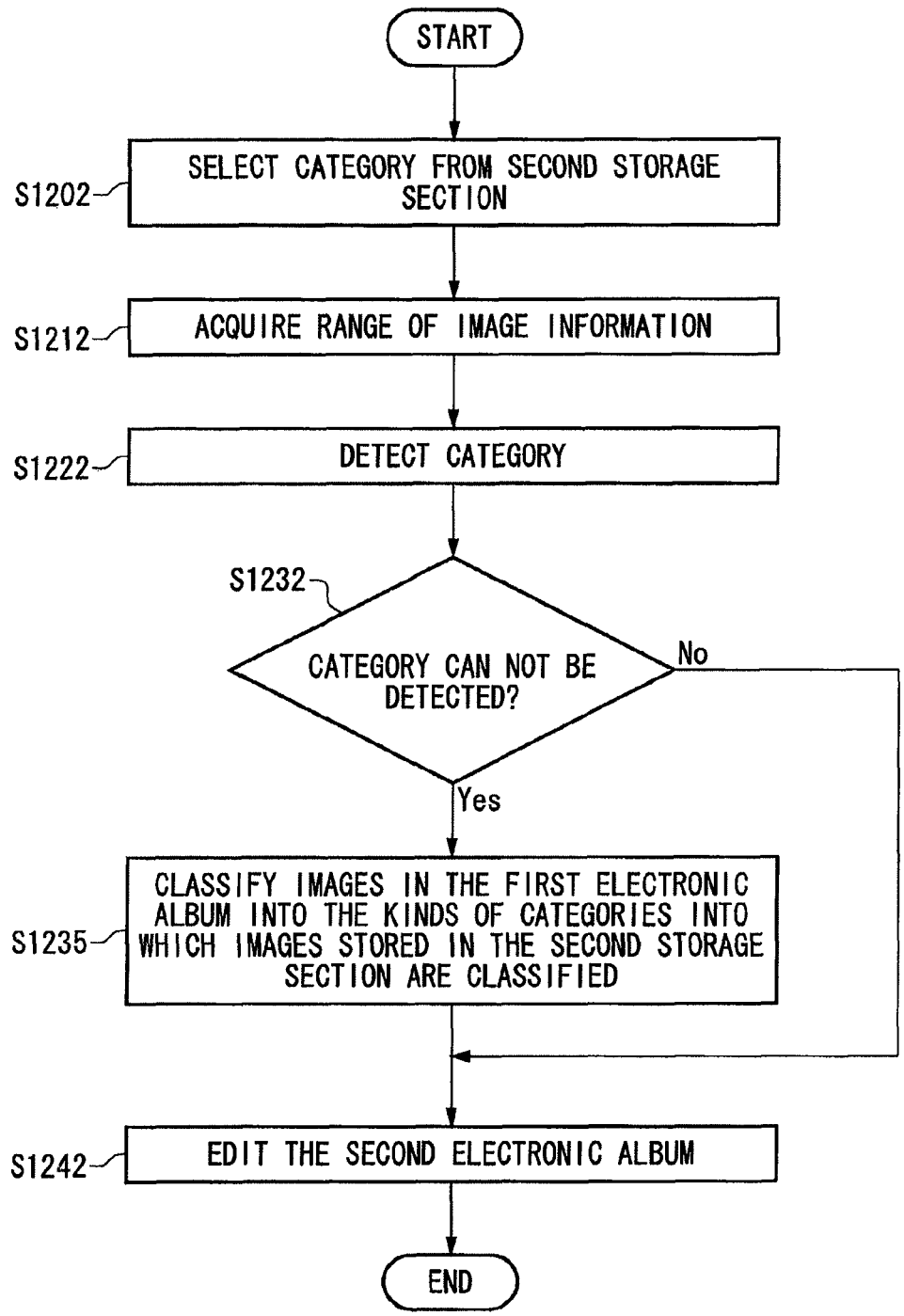
FIG. 16 shows a flowchart of a processing of the electronic album editing system 10.

FIG. 16 shows a flowchart of a processing of the electronic album editing system 10 according to the present embodiment. Firstly, the category selection section 120 selects one category from a plurality of categories into which images stored in the second storage section 110 are classified (S1202). Next, the category selection section 120 outputs image information of the image included in the selected one category to the range acquiring section 130. The range acquiring section 130 acquires the range of image information corresponding to the category selected by the category selection section 120 (S1212). Then, the range acquiring section 130 outputs the acquired range of image information to the category detection section 140. The category detection section 140 attempts to detect a category corresponding to the range similar to the range of image information acquired by the range acquiring section 130 using the image information corresponding to each of the plurality of categories previously stored in the first storage section (S1222).

Here, the category detection section 140 determines whether a category having the range similar to the range acquired by the range acquiring section 130 can not be detected (S1232). When the category detection section can not detect that (S1232: Yes), the category detection section 140 outputs information that it can not detect the category to the image reclassification section 180. Then, the image reclassification section 180 which has received the information that it can not detect the category classifies the plurality of images stored in the first electronic album into the category of which kind is same as that of the category into which the image stored in the second storage section 110 is stored (S1235). Then, the category detection section 140 detects the category classified by the image reclassification section 180 as a category corresponding to the range similar to the range acquired by the range acquiring section 130. The editing section 150 edits the second electronic album by storing in the second storage section 110 at least a part of image classified in the category detected by the category detection section 140 among the plurality of images stored in the first storage section in association with the category selected by the category selection section 120 (S1242). Here, when the category detection section 140 detects the category (S1232: No), the editing section 150 edits the second electronic album by storing in the second storage section 110 at least a part of image classified in the category among the plurality of images store in the first storage section 100 in association with the category selected by the category selection section 120 (S1242).

Figure 17:
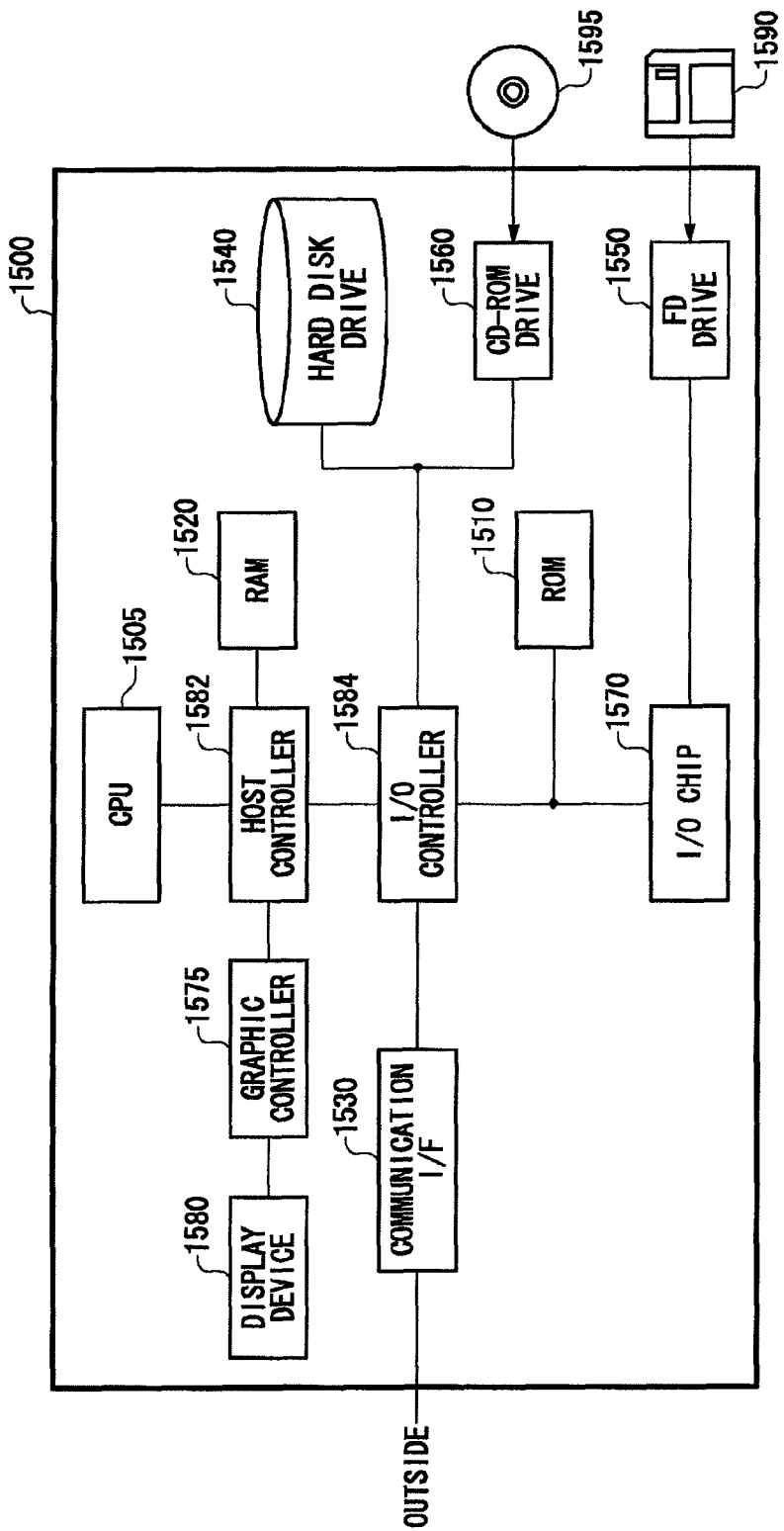
FIG. 17 is a block diagram showing a hardware configuration of a computer 1500.

FIG. 17 is a block diagram showing a hardware configuration of a computer 1500 according to the present embodiment. The computer 1500 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The communication interface 1530 communicates with the other units through a network. The hard disk drive 1540 stores the program and data used by the CPU 1505 of the computer 1500. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the computer 1500 at activating and a program depending on the hardware of the computer 1500. The flexible disk drive 1550 reads the program or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

An electronic album editing program provided to the hard disk drive 1540 through the RAM 1520 is stored in a recording medium, such as the flexible disk 1590, the CD-ROM 1595, or an IC card and provided by the user. The electronic album editing program is read from the recording medium, installed in the hard disk drive 1540 in the computer 1500 through the RAM 1520 and executed by the CPU 1505. The electronic album editing program installed and executed in the computer 1500 operates the CPU 1505 to function the computer 1500 as the above-described electronic album editing system 10 with reference to FIG. 1-FIG. 16.

The above-described electronic album editing program may be stored in an external storage medium. The external recording medium may be an optical storage medium such as a DVD and a PD, a magneto-optical recording medium such as a MD, a tape medium and a semiconductor memory such as an IC card in addition to the flexible disk 1590 and the CD-ROM 1595. A storage medium such as a hard disk or a RAM which is provided in the server system connected to a private communication network or Internet is used as the recording medium to provide the electronic album editing program to the computer 1500 through the network.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An electronic album editing system, provided as a computing device comprising a memory and processor that is communicatively coupled to the memory, for editing an electronic album including a plurality of images, comprising:
    a first storage device for storing each of a plurality of images included in a first electronic album in a corresponding category among a first plurality of categories previously classified by a user of the first electronic album along with range information corresponding to each of the first plurality of categories and indicating a range of image information for images classified in each category;
    a second storage device for storing each of a plurality of images included in a second electronic album in a corresponding category among a second plurality of categories previously classified by a user of the second electronic album;
    a category selection device for selecting one category from the second plurality of categories of the images stored in the second storage device;
    a range acquiring device for acquiring the range of the image information corresponding to the one category from the image information of the image included in the one category;
    a category detection device for detecting a category corresponding to the range similar to the range acquired by the range acquiring device using the range information corresponding to each of the first plurality of categories previously stored in the first storage device; and
    an editing device for editing the second electronic album by storing in the second storage device at least a part of the image stored in the category classified in the category detected by the category detection device, wherein
    the image information includes an image-capturing point of the image included in the electronic album,
    the range acquiring device acquires an image-capturing area, as the range of the image information corresponding to the one category, defined by a polygon which includes the image-capturing points of all the images included in the one category and of which vertexes are selecting points selected from the image-capturing points of all the images, where each of the vertex angles is less than 180 degrees, and
    the category detection device detects the category corresponding to one range information among plural pieces of range information previously stored in the first storage device when the range indicated by the one range information is the only range at least partially overlapped with the range acquired by the range acquiring device.

2. The electronic album editing system according to claim 1, wherein the category detection device detects the category corresponding to the one range information when the range indicated by the one range information is the only range entirely included in the range acquired by the range acquiring device.

3. The electronic album editing system according to claim 1, wherein the category detection device detects the category corresponding to one range information when the ratio between the dimension of the portion over which the range indicated by the one range information is overlapped with the range acquired by the range acquiring device and the dimension of the range indicated by the one range information is more than a predetermined reference value.

4. The electronic album editing system according to claim 1, further comprising:
    An image reclassification device for classifying the plurality of images included in the first electronic album into the kinds of the second plurality of categories into which the plurality of images sored in the second storage device are classified when the category detection device can not detect the category corresponding to the range similar to the range of the image information acquired by the range acquiring device because the kinds of the first plurality of categories into which the plurality of images stored in the first storage device are classified are different from that of the second plurality of categories into which the plurality of images stored in the second storage device are classified, wherein
    the category detection device detects the category classified by the image reclassification device as the category corresponding to the range similar to the range acquired by the range acquiring device.

5. The electronic album editing system according to claim 1, wherein
    the first storage device classifies the plurality of images included in the first electronic album into the first plurality of categories based on the image-capturing point of the image and stores therein the same along with previously storing image-capturing area information indicative of an image-capturing area including all the image-capturing points included in each of the first plurality of categories,
    the second storage device classifies each of the plurality of images included in the second electronic album into the second plurality of categories and stores the same based on the image-capturing point of each image, and
    the category detection device detects a category of the first plurality of categories corresponding to the image-capturing area at least partially overlapped with the image-capturing area acquired by the range acquiring device using the image-capturing area information corresponding to each of the plurality of images previously stored in the first storage device.

6. The electronic album editing system according to claim 5 further comprising:
- an image-capturing information range presentation device for presenting the image-capturing area corresponding to the one category acquired by the range acquiring device to a user; and
- an image-capturing area change control device for causing the user to change the image-capturing area presented by the image information presentation device, wherein
- the category detection device detects a category corresponding to the image-capturing area at least partially overlapped with the image-capturing area changed by the image-capturing area change control device using the image-capturing area information corresponding to each of the first plurality of categories previously stored in the first storage device.

7. An electronic album editing method for editing an electronic album including a plurality of images and comprised of
- a first storage section storing each of a plurality of images included in a first electronic album in a corresponding category among a first plurality of categories previously classified by a user of the first electronic album along with range information corresponding to each of the plurality of categories and indicating a range of image information for images classified in each category, and
- a second storage section storing each of a plurality of images included in a second electronic album in a corresponding category among a second plurality of categories previously classified by a user of the second electronic album, the electronic album editing method comprising:
- selecting one category from the second plurality of categories of the image stored in the second storage section;
- acquiring the range of the image information corresponding to the one category from the image information of the image included in the one category;
- detecting a category corresponding to the range similar to the range acquired in the range acquiring step using the range information corresponding to each of the plurality of images previously stored in the first storage section; and
- editing the second electronic album by storing in the second storage section at least a part of the image classified in the category detected in the category detecting step among the plurality of images stored in the first storage section in association with the one category, wherein
- the image information includes an image-capturing point of the image included in the electronic album, and
- the range acquiring device acquires an image-capturing area, as the range of the image information corresponding to the one category, defined by a polygon which includes the image-capturing points of all the images included in the one category and of which vertexes are selecting points selected from the image-capturing points of all the images, where each of the vertex angles is less than 180 degrees, and
- the category detection device detects the category corresponding to one range information among plural pieces of range information previously stored in the first storage device when the range indicated by the one range information is the only range at least partially overlapped with the range acquired by the range acquiring device.

* * * * *